US006131128A

United States Patent [19]

Lee

[11] Patent Number: 6,131,128

[45] Date of Patent: Oct. 10, 2000

[54] METHOD OF AUTOMATICALLY SELECTING A BNC/D-SUB SIGNAL IN DISPLAY DEVICE HAVING A DISPLAY POWER MANAGEMENT SIGNALING FUNCTION

[75] Inventor: Ji-Young Lee, Suwon-si, Rep. of Korea

[73] Assignee: SamSung Electronics Co., Ltd., Suwon, Rep. of Korea

[21] Appl. No.: 09/060,467

[22] Filed: Apr. 15, 1998

[30] Foreign Application Priority Data

Apr. 15, 1997 [KR] Rep. of Korea ...................... 97-13722
May 16, 1997 [KR] Rep. of Korea ...................... 97-18832

[51] Int. Cl.[7] ............................ G06F 13/00; G09G 5/00

[52] U.S. Cl. .................................... 710/5; 710/5; 710/14; 345/204; 348/705

[58] Field of Search ................................ 710/15, 17, 18, 710/31, 38, 14, 5; 345/204, 211, 10; 348/705, 706

[56] References Cited

U.S. PATENT DOCUMENTS

| | | | |
|---|---|---|---|
| 5,519,414 | 5/1996 | Gold et al. | 345/208 |
| 5,748,332 | 5/1998 | Lee | 358/335 |
| 5,781,250 | 7/1998 | Jun | 348/706 |
| 5,812,120 | 9/1998 | Shim | 345/204 |
| 5,870,086 | 2/1999 | Bang | 345/212 |
| 5,886,545 | 3/1999 | Sakuda et al. | 327/99 |
| 5,917,479 | 6/1999 | Haapakoski | 345/211 |

*Primary Examiner*—Thomas C. Lee
*Assistant Examiner*—Chun Cao
*Attorney, Agent, or Firm*—Robert E. Bushnell, Esq.

[57] ABSTRACT

Provided with a method of and circuit for automatically selecting a signal without using a separate signal selecting switch and for displaying the content of the signal by way of OSD (On Screen Display), the circuit including: a D-sub connector for transmitting a D-sub synchronous signal applied from a D-sub signal cable; a BNC connector for transmitting video signals and synchronous signals applied from a computer via a BNC signal cable; a selector for selecting one of the signals applied from the two connectors in response to a switching signal; and a microcomputer receptive to the BNC/D-sub signal transferred from the selector, and sending a control signal for selecting the BNC/D-sub signal to the selector according to the presence of the synchronous signals and DPMS state.

8 Claims, 7 Drawing Sheets

METHOD OF AUTOMATICALLY SELECTING A BNC/D-SUB SIGNAL IN DISPLAY DEVICE HAVING A DISPLAY POWER MANAGEMENT SIGNALING FUNCTION

BACKGROUND OF THE INVENTION

1. Field of the Invention

The present invention relates to a method of automatically selecting a BNC/D-sub signal in a DPMS (Display Power Management Signalling) display device. More particularly, the present invention relates to a method of and circuit for automatically selecting a signal without using a separate signal selecting switch and for displaying the content of the signal by way of OSD (On Screen Display).

2. Discussion of Related Art

As one of peripheral equipment used in a computer, a display device processes signals transmitted from the computer to create an image so as for the users to recognize it visually.

FIG. 1 is a schematic view of the internal circuit of such a display device.

As shown in FIG. 1, the display device is composed of: a video card 10 built in a computer (not shown) in order to supply video signals R, G and B and horizontal/vertical sync signals H/V-Sync which are needed to produce an image; a microcomputer 20 receptive to the horizontal/vertical sync signals H/V-Sync from the video card 10 and generating a screen control signal to control the screen of a monitor; horizontal and vertical deflection circuits 40 and 30 for providing beam deflection in response to the horizontal/vertical sync signals H/V-Sync, respectively, in such a manner that the electron beams generated from electron guns in CRT 80 are deflected by means of a DY (Deflection Yoke) from left top to right bottom of the screen so as to create an image like a picture; a high voltage circuit 50 for supplying a high voltage to the anode of the CRT 80 with a feedback pulse applied from the output of the horizontal deflection circuit 40 using the principle of a switching circuit and the high voltage technique; a video pre-amplifier 60 functioning as a low voltage amplifier to boost weak video signals R, G and B sent from the video card 10 to a specified high level; and a video main amplifier 70 for boosting the developed video signals R, G and B from the video pre-amplifier 60 to 40–60 $V_{pp}$ so as to supply energy to the respective pixels.

Recently, such a display device employs DPMS, which is to restrict a normal operation by interrupting part of power supply with a view to preventing surplus power consumption, that is, saving power when the device does not receive a designated synchronous signal from the computer.

Functions associated with DPMS are performed as several modes, i.e. the normal mode, stand-by mode, suspend mode and off mode.

To dilate upon these functions, the system enters the normal in response to both horizontal/vertical sync signals transferred from the computer, the stand-by mode when no horizontal sync signal is received, the suspend mode without a vertical sync signal, and the off mode when either of the horizontal/vertical sync signals is received.

There are two methods for transmitting horizontal/vertical sync signals from the computer or other data processing devices to the display device.

The one method is to transmit the signals through a single cable containing both video and synchronous signal lines, as illustrated in FIG. 2*a*. The signals applied on the respective pins of the connector may be varied somewhat depending on the manufacturer of the display device.

The other employs a cable which is an exclusive means for transmitting the horizontal/vertical sync signals, provided separately from a cable for the video signals.

D-sub signals are used to execute OS programs because they are weak in high frequency characteristics, and BNC signals are usually employed for the programs that require high resolution in the high frequency band, such as CAD.

There have been used two methods for selecting a BNC or D-sub signal.

The one method is called a switch selection method to manually select the BNC or D-sub signal with a separate convert switch irrespective of the signal applied to the display device from the computer.

The other is an improved switch selection method wherein the signal applied from a main body is recognized to conduct an automatic switching operation making use of a relay in selecting a BNC or D-sub signal.

However, the aforementioned conventional methods arise several problems as follows:

First, the user himself has to take the trouble to operate the switch manually in the switch selection method. This will deteriorate the working efficiency and productivity in using a switch during a separate step of checking the BNC/D-sub signal.

Second, the relay switching method takes some time in discriminating the type of a signal applied from the main body and causes noises as well as failures due to an increase in the contact resistance arising from the relay's switching operation for a long time.

Third, it is hard to select keys in the DPMS operation because it would encounter some problems in displaying an OSD under no horizontal/vertical sync signals.

SUMMARY OF THE INVENTION

Accordingly, the present invention is directed to a method of and circuit for automatically selecting a BNC/D-sub signal that substantially obviates one or more of the problems due to limitations and disadvantages of the related art.

An object of the present invention is to provide a method of and circuit for automatically selecting a BNC/D-sub signal wherein the type of a signal applied from the main body of a computer is discriminated in an automatic manner and thereby the signal is converted to the BNC or D-sub signal with less noises or failure caused by contact wear relative to the prior art.

Another object of the present invention is to provide a method of selecting a synchronous signal in an automatic manner by checking the BNC/D-sub signal repeatedly, and of processing DPMS in the absence of an input for a specified period of time.

A further another object of the present invention is to display information relating to a change of input signals on an OSD screen in order for the user to recognize the information visually by discriminating the current synchronous signal when the change of input signals is toggled.

A still further another object of the present invention is to provide a method of selecting the BNC/D-sub signal wherein the user can select an input signal by sending a control signal for the input signal selection to a microcomputer making use of a control button for screen adjustment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a circuit for automatically selecting a BNC/D-sub signal of a display device includes: a D-sub connector for transmitting a D-sub synchronous signal applied from a D-sub signal cable; a BNC connector for transmitting video signals and synchronous signals applied from a computer via a BNC signal cable; a selector for selecting one of the signals applied from the two connectors in response to a switching signal; and a microcomputer receptive to the BNC/D-sub signal transferred from the selector, and sending a control signal for selecting the BNC/D-sub signal to the selector according to the presence of the synchronous signals and DPMS state.

Further, the selector is so constructed as to selectively transmit the BNC or D-sub signal through the respective bases of an emitter-follow type switching device, the bases being grounded in common.

On the other hand, a method of automatically selecting a BNC/D-sub signal, which makes use of an OSD function key includes the steps of: receiving a signal from the OSD function key in an interrupt manner; analyzing the operation of the OSD function key chosen; when the OSD function key indicates the change of the BNC/D-sub input signal, checking a current synchronous signal and displaying corresponding information; when the OSD function key is chosen for changing the BNC/D-sub input signal, sending a control signal for changing the BNC/D-sub input signal from a microcomputer; and displaying information relating to the current input signal as OSD characters according to the change of the input signal.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

The present invention has a technical base upon a display device which is capable of realizing the DPMS mode and uses at least two signal sources, e.g. BNC and D-sub signals generated from a data processing device.

Figure 1:
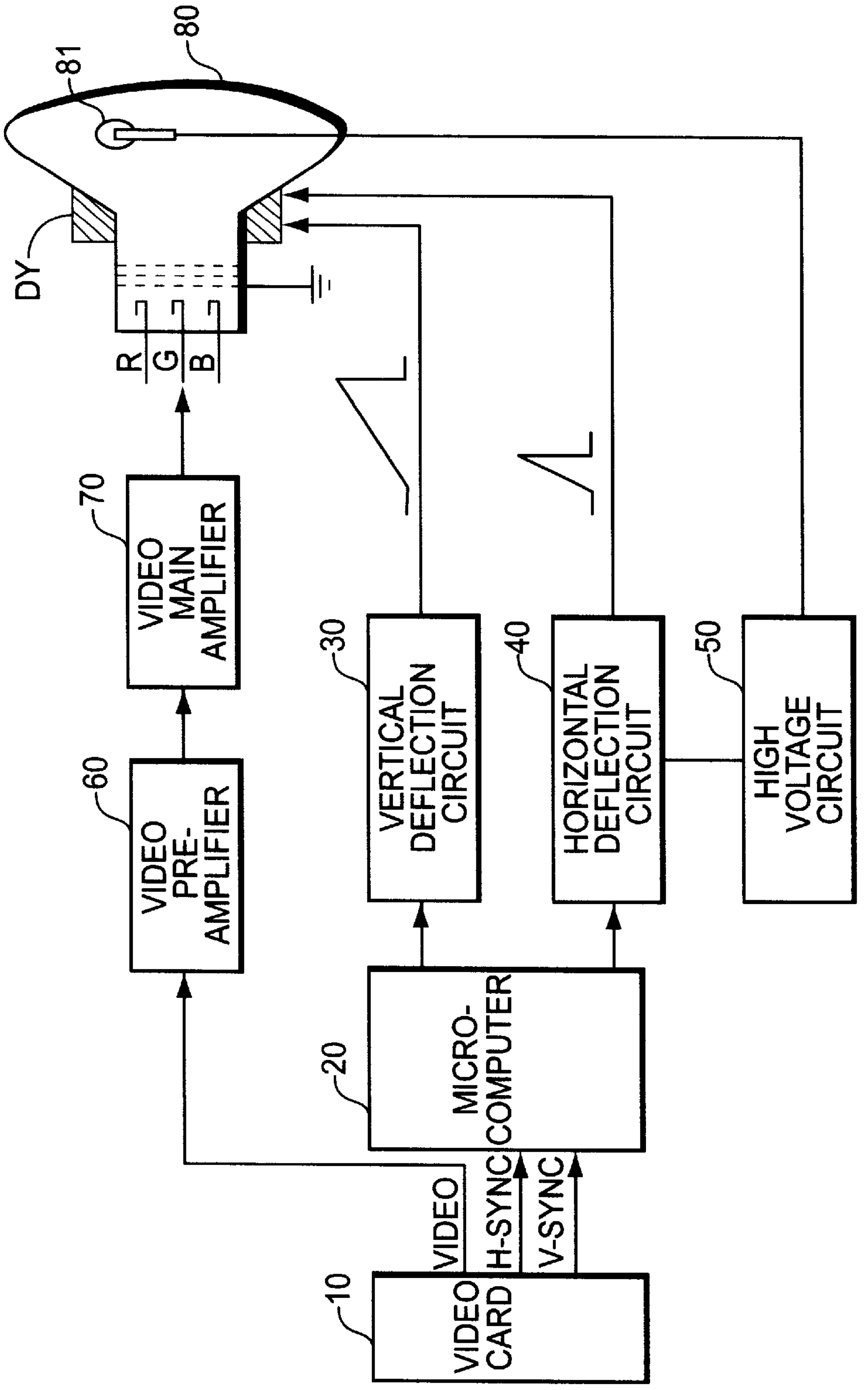
FIG. 1 is a schematic block diagram of a general display device.
Figure 2A:
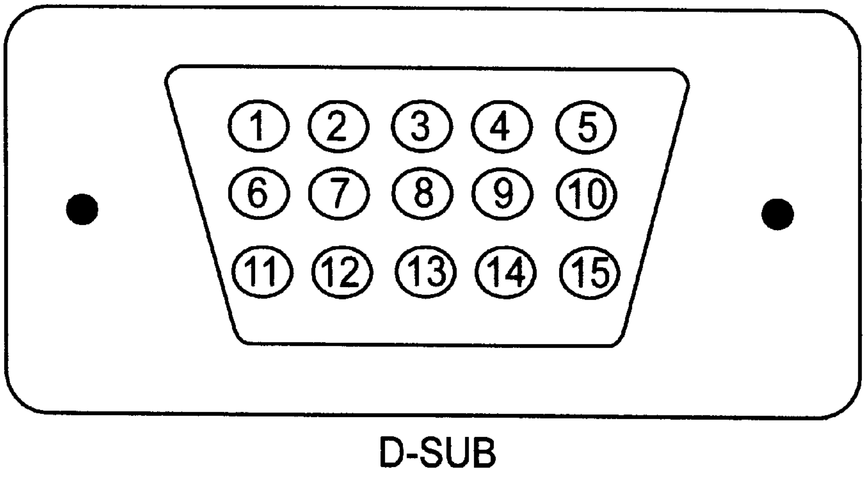
FIGS. 2A and 2B are exemplary diagrams of BNC and D-sub cables used in the transmission of signals.
Figure 2B:
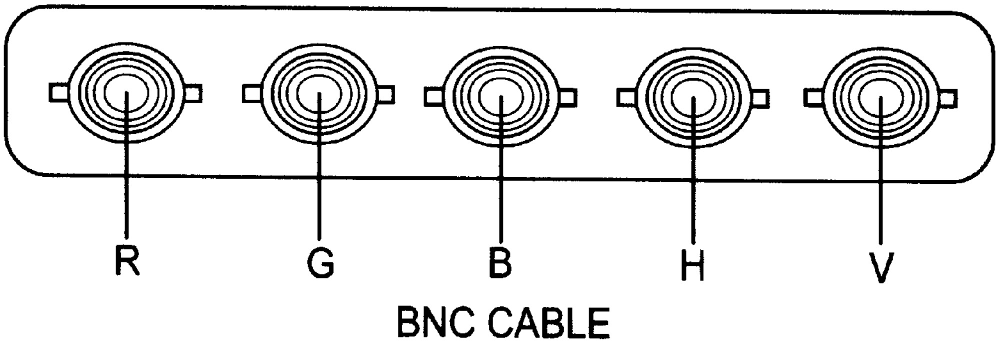
Figure 3:
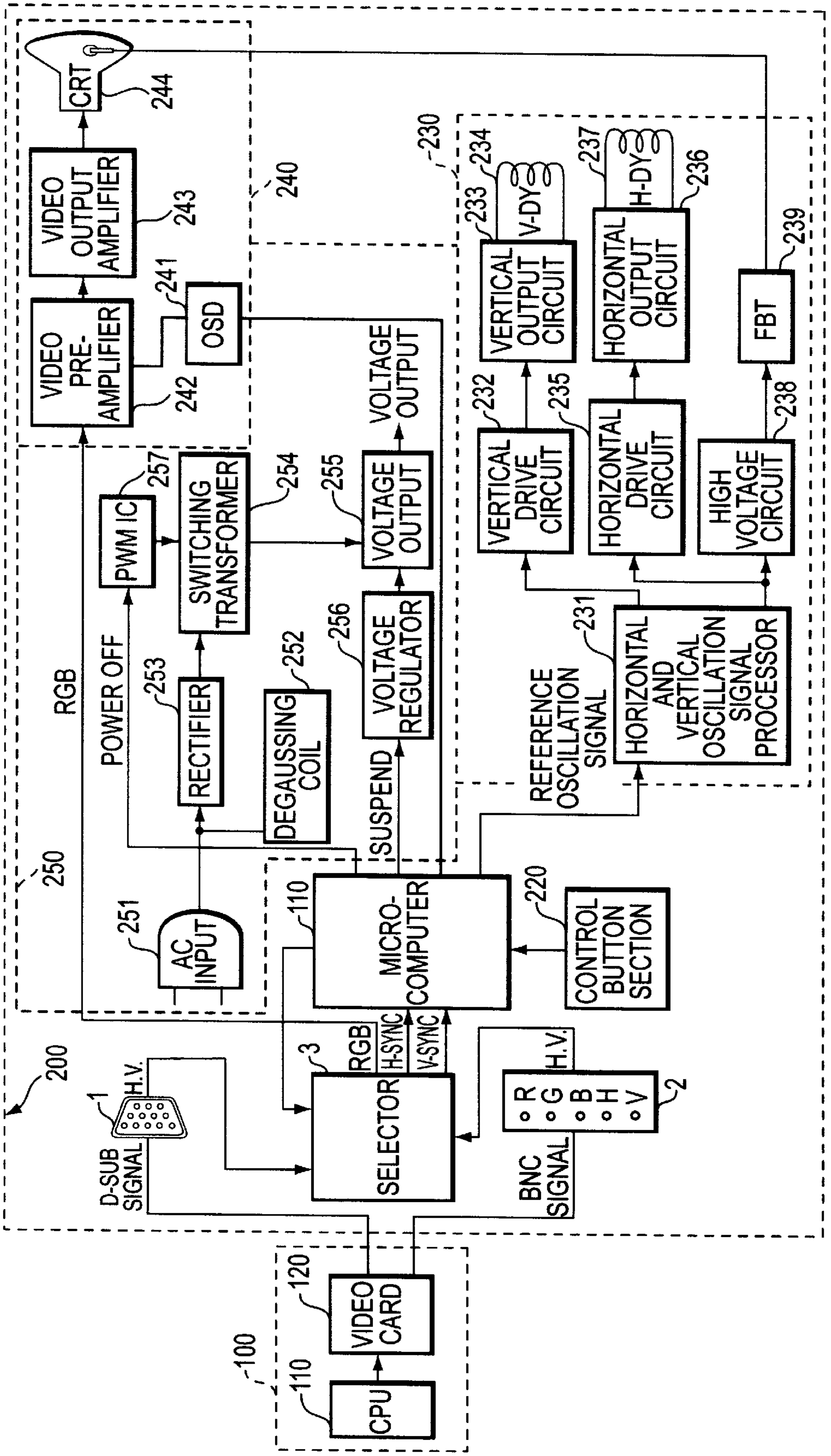
FIG. 3 is a block diagram of a display device having an automatic BNC/D-sub selection circuit in accordance with the present invention.

FIG. 3 is a detailed block diagram of a display device in accordance with the preferred embodiment of the present invention.

Referring to FIG. 3, computer 100 includes a CPU 110 for processing a keyboard signal and generating output data, and a video card 120 for processing the output data of the CPU 110 into video signals R, G and B and generating horizontal/vertical sync signals H/V-Sync to synchronize the video signals.

According to the characteristic of a computer program currently in use, the video signals R, G and B and the horizontal/vertical sync signals H/V Sync sent from the video card 120 in the computer 100 are transferred to a monitor 200 by way of a D-sub or BNC connector.

Hence, the monitor used in the present invention has two connectors and is constructed to receive either one of two signals alternatively. That is, when a signal is applied from a computer via D-sub connector 1, the monitor receives a D-sub input signal, while a BNC input signal is received by the monitor in case of a video signal having high frequency property transferred through BNC connector 2.

At this stage, selector 3 is responsible for selection of the input signal, i.e. D-sub or BNC signal. The selector 3 receives a control signal sent from a microcomputer 210 for selection of the input signal, in response to the horizontal/vertical sync signals.

Microcomputer 210 is receptive to horizontal/vertical signals applied from the selector 3 and thereby generates adjusting signals such as an image adjusting signal and a reference oscillating signal at its rear terminal.

Control button section 220 generates all sorts of screen control signals for the operation of the microcomputer 210. Once the user intends to change the input signal to be selected, it is recognized by the microcomputer 210.

Horizontal/vertical output circuit section 230 receives the screen control signal and the reference oscillating signal from the microcomputer 210, synchronizing a raster.

Video circuit section 240 amplifies the video signals generated from the video card 120.

Driving power is supplied through a power circuit section 250 to the microcomputer 210, the horizontal/vertical output circuit section 230, and the video circuit section 240.

Sent from the selector 3, the D-sub or BNC horizontal/vertical sync signals H/V-Sync are applied to the microcomputer 210 which restores all sorts of screen control data.

Upon receipt of the horizontal/vertical sync signals H/V-Sync, the microcomputer 210 generates a signal for adjusting the image displayed on the screen in response to the screen control signal applied from the control button section 220.

To save the power in the monitor 200, the microcomputer 210 checks the presence of the horizontal/vertical sync signals and enters the DPMS mode.

Figure 4:
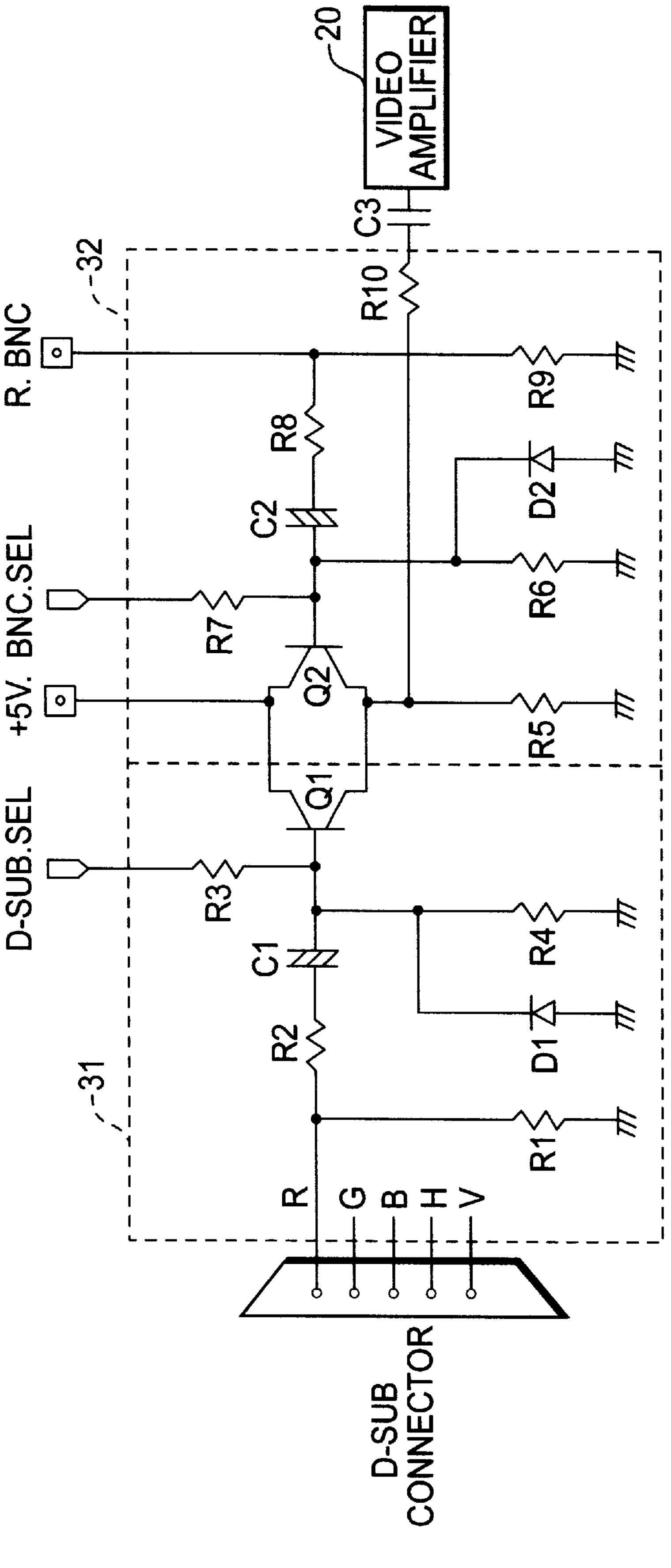
FIG. 4 is a detailed circuit diagram of the BNC/D-sub selection circuit shown in 3.

FIG. 4 is a detailed circuit diagram of the BNC/D-sub selection circuit shown in FIG. 3, wherein only a component related to the selection of the red signal out of video signals R, G and B is shown for example. The components for selection of green and blue signals are analogous to that of the red signal and omitted in the figure.

As shown in FIG. 4, the circuit is largely divided into two parts, D-sub input 31 and BNC input 32. A selected signal will be generated from the emitters of emitter-follow type transistors Q1 and Q2 through resistance R10.

A D-sub/R signal which has been divided through resistances R1 and R2 is first transferred to the base of the transistor Q1 via capacitor C1. At the same time, a D-sub selection signal D-sub SEL is divided through resistances R3 and R4 and supplied to the base as a bias voltage.

Likewise, a BNC red signal R-BNC divided through resistances R8 and R9 is sent to the base of the transistor Q2 via capacitor C2, and a BNC selection signal BNC-SEL is divided through resistances R7 and R9, applied to the base as a bias voltage.

On the other hand, a specified voltage, e.g. 5 volts is applied to the collectors of the transistors Q1 and Q2 and the emitters generate a video signal R through the outputs which are commonly grounded with resistance R5.

The BNC/R and D-sub/R selection signals are supplied from the microcomputer 210 as "0" or "1", which is illustrated in the part "A" of FIG. 3.

When the power is initially applied, the output signal of the microcomputer is set at "0" and the D-sub selection signal is of "high" level with the BNC selection signal being "low".

In case the D-sub selection signal is "high", the emitter-base voltage $V_{BE}$ of the transistor Q1 is turned on, and accordingly, the D-sub signal fed into the base is transmitted through the emitter. The transistor Q2 whose base receives a signal of "low" level is turned off.

Contrary to this, where the BNC selection signal is "high", a BNC/R signal is generated through the emitter of the transistor Q2.

Below is a description of a signal selecting method, wherein a bias voltage generated from the microcomputer is selectively applied to the bases of the two transistors Q1 and Q2 of the input terminals 31 and 32.

Figure 5:
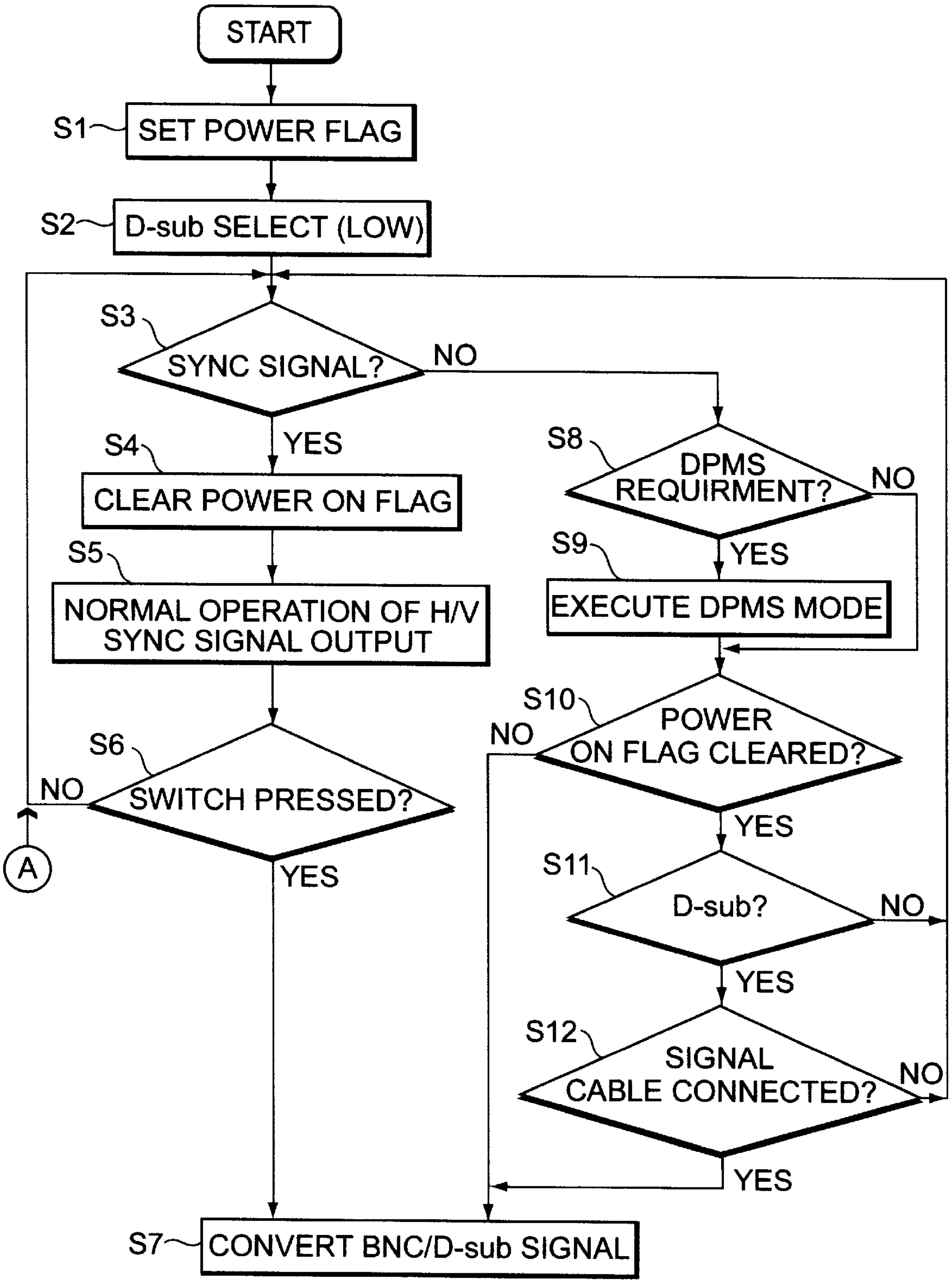
FIG. 5 is a flow chart illustrating a method of automatically selecting BNC/D-sub signals in accordance with the present invention.

FIG. 5 is a flow chart illustrating a method of automatically selecting BNC/D-sub signals in accordance with the present invention.

At first, a power on flag P_F is set with the power supplied, in step S1.

The select output signal of the microcomputer is set at "0" and the base mode is for the selection of a D-sub signal, in step S2. This base mode is exemplary only in the embodiment of the present invention.

Then, the microcomputer checks the presence of horizontal/vertical sync signals, in step S3.

In the normal state where the video signal applied from the computer is transmitted through a D-sub connector without failure, the power on flag P_F is cleared, in step S4.

The horizontal/vertical sync signals are sent to a horizontal/vertical oscillator connected to the rear terminal of the microcomputer, performing a normal operation, in step S5.

At this time, the user can select the input of the control button section in an interrupt manner. He selects a BNC or D-sub sync signal through an OSD screen, in step S6, and converts the BNC/D-sub signal, in step S7.

If the microcomputer recognized the absence of horizontal/vertical sync signals in step S3, it checks whether the signal satisfies the requirement for the DPMS that the horizontal sync signal is lower than 10 kHz with the vertical sync signal below 40 Hz for more than 3 seconds, thereby determining whether to enter the DPMS mode, in step S8.

Once all conditions meet the requirement for the DPMS, the DPMS mode is driven, in step S9.

When a specified period of time have passed since the beginning of the DPMS mode or there's no synchronous signal received after the power is turned on, the setting state of the power on flag P_F is checked, in step S10.

[If the power on flag in this case is set in the microcomputer, the input signal conversion (step S7) is performed in an immediate manner. If the power on flag is cleared, whether the current input signal is the D-sub will be checked in step S11, thereby checking the connection of the D-sub signal cable. The connection of the D-sub signal cable is dependent upon the power supply of 5 volts to the 10th pin.

Figure 6:
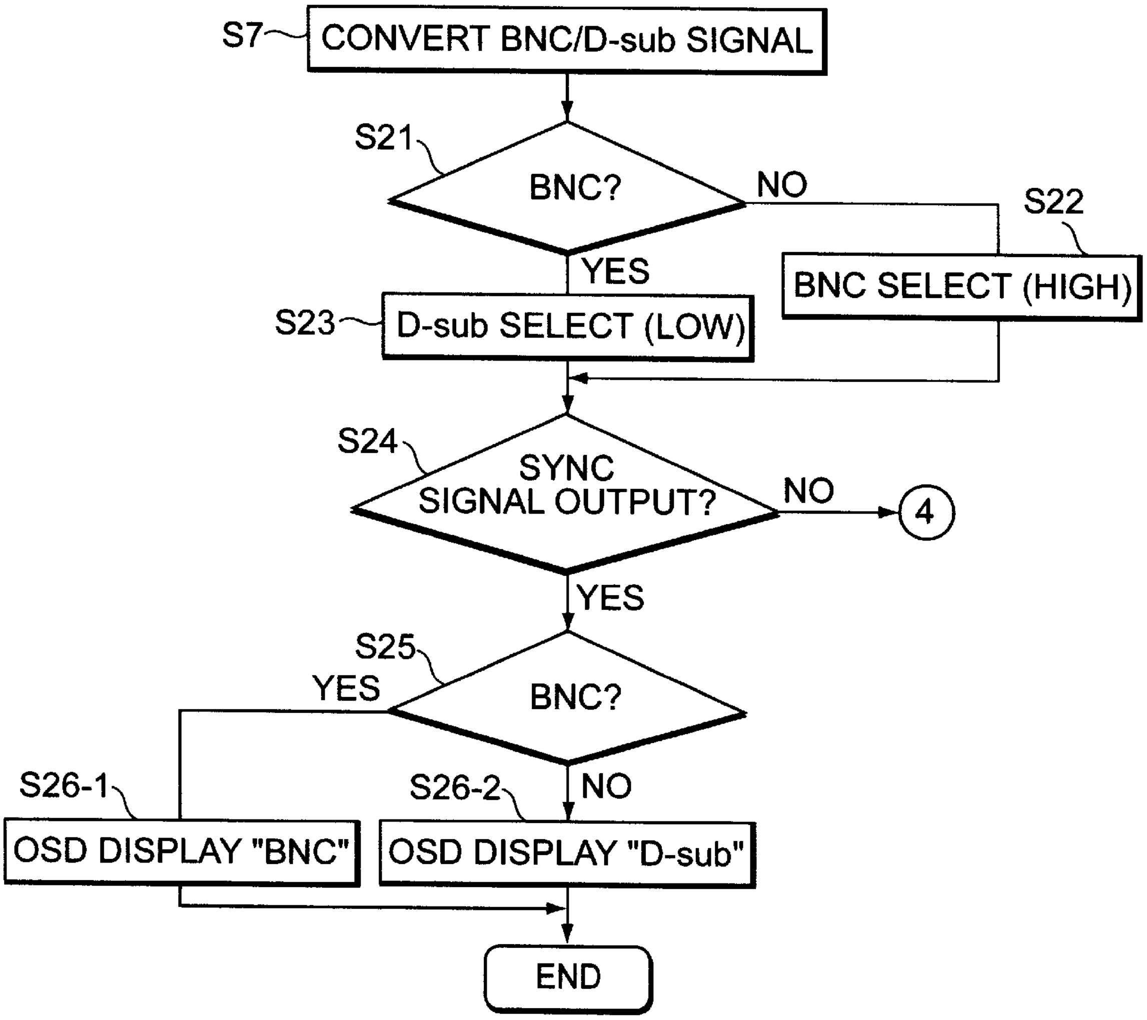
FIG. 6 is a flow chart illustrating a process for BNC/D-sub conversion according to the embodiment of the present invention.

FIG. 6 illustrates a process for the BNC/D-sub input signal conversion.

The BNC/B-sub conversion will be achieved as follows.

For the first case, the user presses a control button for the input signal conversion so that the BNC or D-sub input signal normally applied to the input pin is converted to the other. This operation can be realized by means of the OSD screen.

For the second, the conversion of the BNC/D-sub input signal is provided when no sync signal is applied in the current condition which has been set according to the power supply.

In order to provide such an input signal conversion, the BNC/D-sub select signal on the input port of the microcomputer is set at "1", which is a toggle type output signal for changing the current switching state.

The current connection state is checked in step S21. That is, the switching operation is performed in such a manner that the BNC input signal is received in response to the input signal "1" in the D-sub selected state in step S22, while the BNC signal is converted to the D-sub selection signal in response to the input signal "1" in step S23.

The presence of a horizontal/vertical sync signal selected a second time is checked in step S24. If there is no sync signal, the process returns to the upper routine, step S3 for checking the horizontal/vertical sync signal.]

With the horizontal/vertical sync signals received, the microcomputer checks if they are BNC signals, in step S25.

Figure 7A:
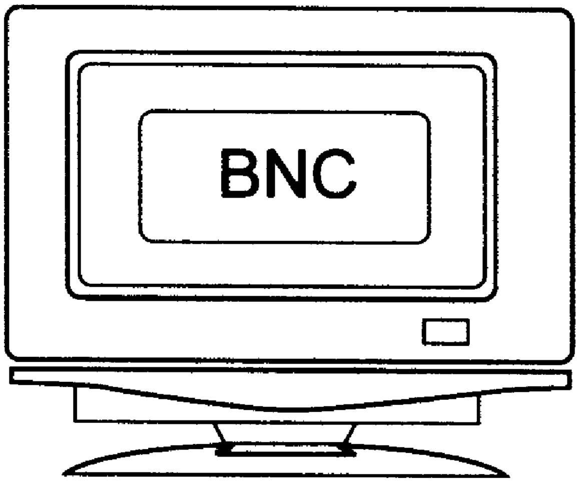
FIG. 7 is an exemplary diagram illustrating the current signal input displayed on an OSD screen.
Figure 7B:
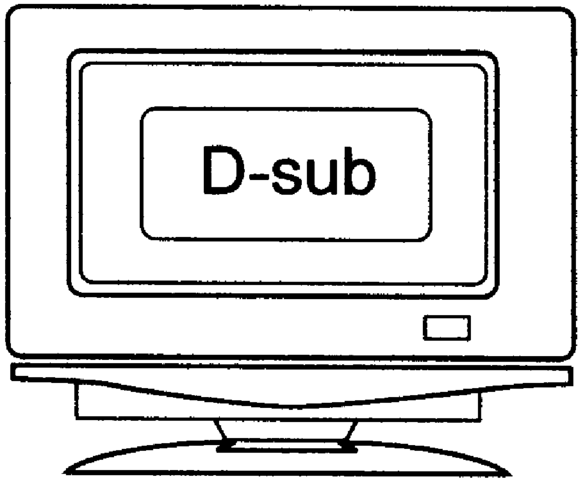

Under BNC signals, a message "BNC" appears on the OSD (on Screen Display) screen as shown in FIG. 7*a*, in step S26-1.

Otherwise, a message "D-sub" is displayed on the OSD screen in order for the user to recognize the current state as shown in FIG. 7*a*, in steps 26-2.

The same OSD screen is displayed even when the user presses a control button to change the input signal.

As described above, the present invention displays an image on the screen by checking the BNC/D-sub signals all the time with the synchronous signals recognized.

According to the present invention, the user has not to take the trouble to select the type of signals and he can intend to convert the signals whenever he wants.

If there is no connection with the D-sub signal cable, the BNC signal is selected in an automatic manner and the presence of synchronization is then checked. Under the sync signals, pictures as well as the signal input state are displayed on the screen.

Furthermore, the productivity can be enhanced as the BNC/D-sub signals are automatically checked in the process of production.

It will be apparent to those skilled in the art that various modifications and variations can be made in the method of automatically selecting a BNC/D-sub signal in a DPMS display device according to the present invention without departing from the spirit or scope of the invention. Thus, it is intended that the present invention cover the modifications and variations of this invention provided they come within the scope of the appended claims and their equivalents.

What is claimed is:

1. A method of automatically selecting a BNC/D-sub signal, which is applicable to a display device, the method comprising the steps of:

selecting the D-sub signal as a basically predetermined signal by setting the output of an input signal control terminal of a microcomputer at "0" with power applied to the microcomputer;

checking the presence of a synchronous signal for the input D-sub signal and whether the synchronous signal is in the range of a receipt frequency of the display device;

without synchronous signal received, converting to the DPMS mode insofar as the requirements for DPMS are satisfied;

when the current mode is the BNC mode, converting to the D-sub mode, and vice-versa; and checking the presence of synchronous signal for the selected mode.

2. The method as defined in claim 1, wherein when the synchronous signal is inputted in the state the input signal is selected, a message "BNC" or "D-sub" is displayed as an OSD character indicating the current state.

3. A method of automatically selecting a BNC/D-sub signal of a display device, comprising the steps of:

(a) checking the presence of an input synchronous signal by setting the output of an input signal control terminal of a microcomputer at "0" and selecting the D-sub signal as a basically predetermined signal;

(b) determining whether to execute the DPMS mode according as the input synchronous signal meets the requirements for the DPMS mode;

(c) checking the connection of a D-sub cable; and (d) determining whether to change the selection of the input signal according to the presence of the input synchronous signal selected.

4. The method as defined in claim 3, wherein whether the input synchronous signal lies in the range of a receipt frequency of the display device is checked in step (a).

5. The method as defined in claim 3, wherein the presence of voltage applied to a specified pin of the D-sub cable is checked in step (b).

6. The method as defined in claim 3, further comprising the steps of:

when the current mode is the BNC mode, converting to the D-sub mode, and vice-versa; and checking the presence of input synchronous signal in the state the select signal has been changed.

7. A method of automatically selecting a BNC/D-sub signal of a display device, comprising the steps of:

checking the presence of an input synchronous signal by setting the output of an input signal control terminal of a microcomputer at "0" with power applied;

determining whether to change an input signal by checking the connection of a D-sub cable;

changing the input synchronous signal by pressing a control button according as the user wants to change the input signal;

determining whether to execute the DPMS mode according as the input synchronous signal meets the requirements for the DPMS mode;

when the input signal is changed, selecting the input signal by detecting the current input synchronous signal and generating a control signal according to the current synchronous signal detected; and displaying information relating to the current input signal as an OSD character according to the presence of the input synchronous signal selected.

8. A method of automatically selecting a BNC/D-sub signal, which is applicable to a display device, the method comprising the steps of:

checking a first picture signal as predetermined basically;

when a first picture signal is not detected for a specified period of time, switching a selector in order to receive a second picture signal; and without the second picture signal being input, switching the selector in order to receive the first picture signal again.

* * * * *